United States Patent [19]
Ahrens

[11] Patent Number: 5,848,144
[45] Date of Patent: Dec. 8, 1998

[54] SWITCH CUTOVER WITH PACED TRANSITION

[75] Inventor: Peter Robert Ahrens, San Mateo, Calif.

[73] Assignee: Pacific Bell, San Francisco, Calif.

[21] Appl. No.: 724,903

[22] Filed: Oct. 3, 1996

[51] Int. Cl.[6] .............................. H04M 7/00; H04M 3/42; H04M 15/00
[52] U.S. Cl. .......................... 379/219; 379/220; 379/207; 379/133
[58] Field of Search ...................... 379/219, 220, 379/207, 133, 221, 327, 225, 9, 10, 15, 28

[56] References Cited

U.S. PATENT DOCUMENTS

| | | | |
|---|---|---|---|
| 3,920,927 | 11/1975 | De Luca | 379/15 |
| 4,122,313 | 10/1978 | De Luca | 379/327 |
| 4,286,121 | 8/1981 | Olszewski et al. | 379/329 |
| 4,334,129 | 6/1982 | De Luca et al. | 379/329 |
| 4,653,043 | 3/1987 | Brady et al. | 370/250 |
| 5,117,501 | 5/1992 | Childress et al. | 455/111 |
| 5,187,733 | 2/1993 | Beffel et al. | 379/10 |
| 5,410,589 | 4/1995 | Galligan | 379/134 |
| 5,619,562 | 4/1997 | Maurer et al. | 379/207 |
| 5,627,827 | 5/1997 | Dale et al. | 379/231 |
| 5,680,446 | 10/1997 | Fleischer, III et al. | 379/229 |
| 5,696,816 | 12/1997 | Sonnenberg | 379/219 |

OTHER PUBLICATIONS

Inventor Peter R. Ahrens, "Wire Center Transition to the Full Service Network", Pacific Bell, presentation at Design Criteria Today WCF '95, Mar. 8, 1995, (see entire document).

Primary Examiner—Daniel S. Hunter
Assistant Examiner—Benny Q. Tieu
Attorney, Agent, or Firm—Merchant, Gould, Smith, Edell, Welter & Schmidt

[57] ABSTRACT

According to a system for switched cutover with paced transition, subscribers are transitioned to a new communication system while the capacity needed by the cutover facility is minimized. A cutover facility between a pre-cut switch and a post-cut switch for transitioning a first and a second set of subscribers from a first communication system to a second communication system is established. The migration of the first and the second set of subscribers from the pre-cut switch to the post-cut switch is begun. A transition midpoint is identified. The transition midpoint occurs when the number of subscribers migrated to the post-cut switch is equal to the number of subscribers remaining on the pre-cut switch. End office traffic routed to the pre-cut switch is then shifted to the post-cut switch in response to the transition midpoint being identified. Finally, the remaining subscribers are shifted to the post-cut switch. This transition may be performed using a slice-cut dial-with-dial transfer.

23 Claims, 5 Drawing Sheets

Per Line ATS Cutover Intraoffice Demand on Cutover Facility

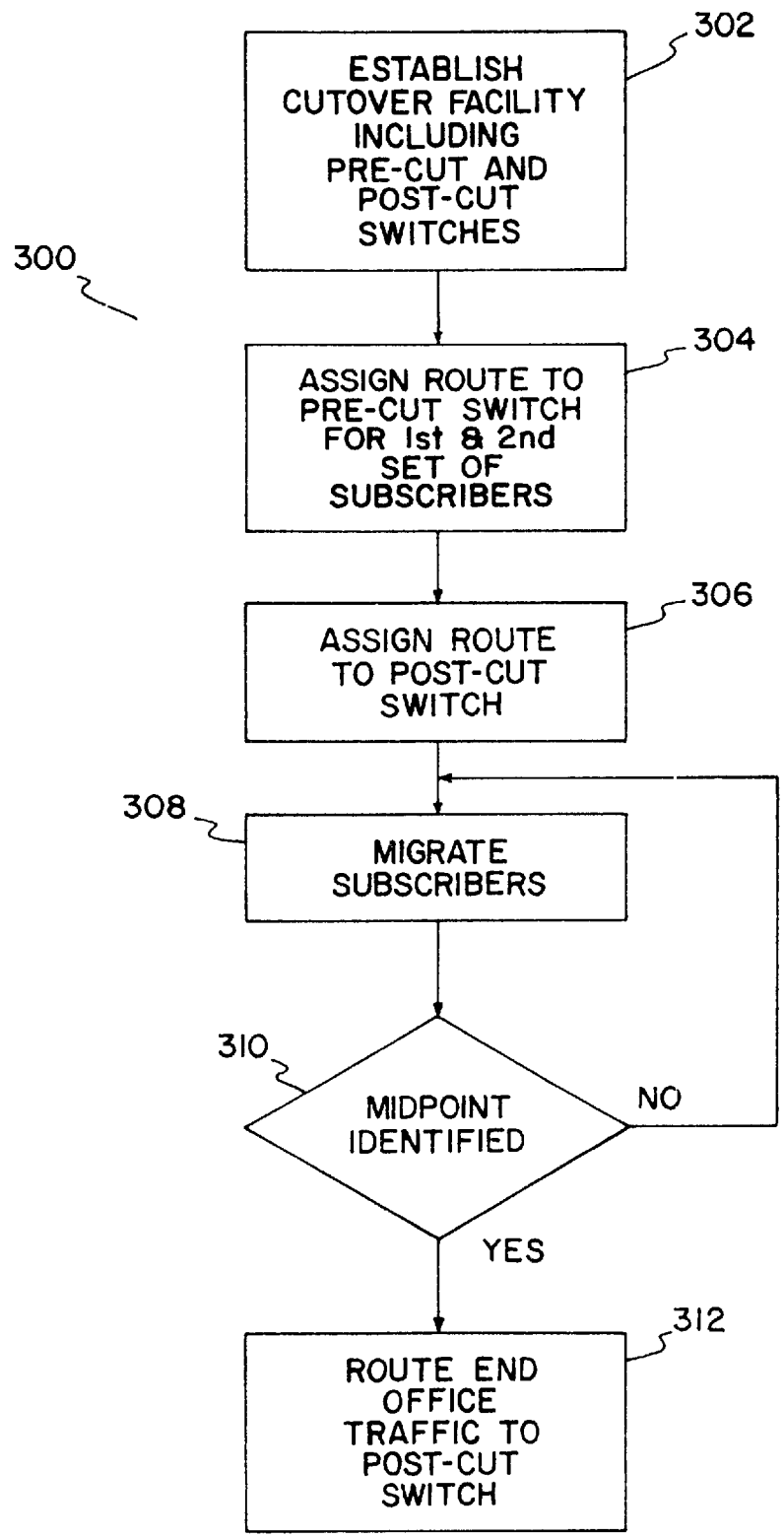

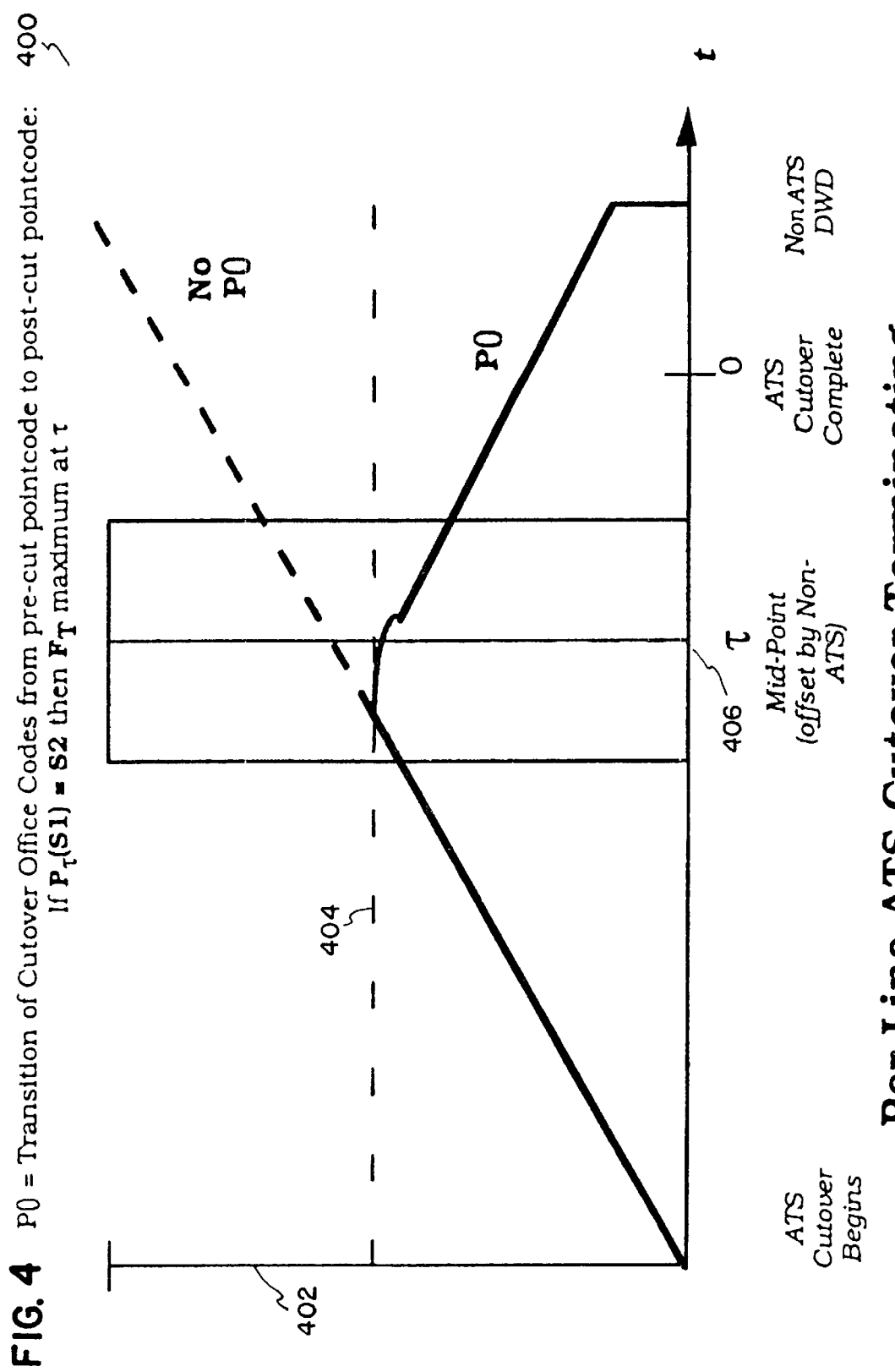

SWITCH CUTOVER WITH PACED TRANSITION

BACKGROUND OF THE INVENTION

1. Field of the Invention

This invention relates in general to routing and delivering calls in a telecommunications network, and more particularly, to a method of performing cutover transitioning of subscribers to a new communication system while minimizing the capacity needed by the cutover facility.

2. Description of Related Art

A Central Office (CO) is the facility to which the telephones in a public telephone network are connected. The central office is the front line in terms of the whole telephone system since dial tone, telephone ringing, and connection to other telephones or outside trunks are performed there. A "switch" is a general term referring to facilities where telephone traffic is routed from one destination to another. The Central Office has a switch in a local sense, i.e., calls within a municipality can often be completed within a single switch. Beyond this, there are switches for long distance or regional traffic, many of which are not directly connected to user telephones.

Originally, telephone switches were manual, operator-run switchboards. Today, these are generally found in developing countries or in certain remote locations as newer types of switches allow for connection to automatic telephone service.

Step-by-step was the first widely-used automatic switching method. This was an electromechanical system which made use of rotating blades and mechanical selection of various levels. Dial pulses were used to cause the switches to select switch groups until the whole number was dialed.

Step-by-step, with its mechanical nature, can be difficult to troubleshoot and maintain, and does not inherently support touch tones or special calling features without special addition of equipment. Currently, some step-by-step facilities remain in operation. However, they will eventually be replaced by more modern forms of switching (typically a digital facility).

Crossbar switching was the next step in electromechanical switching. Rather than the rotary/level switches used in step-by-step, connections were completed by means of a matrix of connectors. The configuration of crossbar matrix elements was under "common control" which could route the call along a variety of crossbar elements. In contrast, step-by-step's "progressive control" could not be rerouted to avoid points of congestion in the switches but was rather at the mercy of which numbers would be dialed by the telephone users.

Electronic switches were developed in the 1960's. These were often reed relay switches with an electronic common control which were much faster than previous crossbar systems. The fewer moving parts which were incorporated into the switches, the more reliable the switches became. Furthermore, electronic systems were needed to provide modern services such as call waiting or call forwarding.

These electronic switches eventually led to the development of today's advanced digital electronic systems which provide fully-programmable telephone operations. These switches are all-electronic systems which process calls without moving parts (i.e. solid-state switching) and full computerization of control. Voice traffic is converted to a digital format for use with digital transmission facilities. A wide variety of user services can be implemented such as sophisticated types of call forwarding or Caller ID or ISDN (Integrated Services Digital Network).

While at the present time, various kinds of switching systems are in still in use, ultimately, all telephone subscribers will be served by digital switches as described above. Nevertheless, there are significant costs associated with upgrading the network to eventually use digital, fully-programmable switching.

One type of network that includes packet transmitting and receiving nodes is a telecommunication signaling network interconnecting telecommunication exchanges, known as Signaling System 7 (SS7) as defined by the International Telegraph and Telephone Consultative Committee (CCITT) or the American National Standard Institute (ANSI). In such a system, information relating to the connection of telephone calls is communicated between exchanges via the SS7 network in a packet format. Packet-switched networks (PSNs) perform routing by the use of routing tables. The tables located at each node contain information that allows the transmission of the packets on the appropriate output channel(s).

As can be seen by the advantages provided by such a system, the replacement of a technologically obsolescent exchange with an exchange that embodies the state of the art in telecommunications switching products becomes desirable so that more features, more traffic, and support for state of the art telecommunications services may be provided. Often such a transition is performed by replacing the entire switching system of the exchange together with its interface connections to subscriber lines and trunk circuits connecting the exchange to the remainder of the telecommunications network.

The transition or cutover is performed at the Local Digital Switch (LDS) which hosts the subscriber's Directory Number (DN). Before cutover, the directory number is associated with originating equipment served by the switch peripheral unit which is connected to the copper pair, an Analog Line Unit (5ESS), Line Group Controller Line Card (DMS-100), or Line Link Network (1AESS). After cutover, the directory number is associated with originating equipment served by an Integrated Digital Loop Carrier (IDLC). In 5ESS, the IDLC is an Integrated Digital Carrier Unit (IDCU); in DMS-100, the IDLC is Expanded Port Subscriber Module Access (ESMA).

The actual method and procedure of directory number cutover depends on the host switch technology and configuration of the wire center. There are three basic configurations, and three supplementary configurations. The basic configurations include a single host local digital switch, 1A to 5ESS, and 1A to DMS-100. The single host local digital switch configuration is where the IDLC is deployed in the local digital switch (LDS) which currently serves the subscriber's analog line peripheral unit (5ESS and DMS-100). Advanced telecommunications system cutover in the single host LDS configuration is a Line Equipment Transfer (LET).

The 1A to 5ESS configuration is where the subscriber's analog line is served by a 1AESS line link network and the subscriber's advanced telecommunications system is to be served by a 5ESS IDCU in the same wire center. Advanced telecommunications system cutover is a transition from the 1AESS line equipment to the 5ESS line equipment.

The 1A to DMS-100 configuration is where the subscriber's analog line is served by a 1AESS and the subscriber's advanced telecommunications system is to be served by a DMS-100 ESMA in the same wire center. Advanced telecommunications system cutover is a transition from the 1AESS line equipment to the DMS-100 line equipment.

The supplementary configurations include DMS-100 to 5ESS, 5ESS to DMS-100, and same technology transition. The DMS-100 to 5ESS configuration is where the subscriber's analog line is served by a DMS-100 and the subscriber's advanced telecommunications system is to be served by a 5ESS IDCU in the same wire center. Advanced telecommunications system cutover is a transition from the DMS-100 line equipment to the 5ESS line equipment.

The 5ESS to DMS-100 configuration is where the subscriber's analog line is served by a 5ESS and the subscriber's advanced telecommunications system is to be served by a DMS-100 ESMA in the same wire center. Advanced telecommunications system cutover is a transition from the 5ESS line equipment to the DMS-100 line equipment.

Finally, the same technology transition is where the subscriber's analog line is served by one 5ESS or DMS-100 line peripheral unit and the subscriber's advanced telecommunications system is to be served by another 5ESS IDCU or DMS-100 ESMA in the same wire center. An example of this configuration is a transition from 5ESS Remote Switch Module to 5ESS Host at the same site. Advanced telecommunications system cutover is a transition from the RSM or RSC line equipment to the Host 5ESS or Host DMS-100 line equipment, respectively.

In all cases, a transition must be done without significantly interrupting telephone service normally provided by the exchange. Therefore, an immediate switchover which would inherently produce unacceptable performance problems is troublesome.

Accordingly, a transition which includes a cutover facility to transport calls between a pre-cut and post-cut switch is more desirable. The cutover facility allows testing and confirmation of system performance. With this type of transition, the host switch of the called directory number depends on the new cutover status of the directory number and the point code associated with the office code of the called directory number in the routing translations of the calling office.

A directory number in the pre-cut switch is in the pre-cut status when it is assigned to originating equipment and copper facilities, and the directory number in the pre-cut switch is in the post-cut status when the directory number is assigned to a route to the cutover facility. A directory number in the post-cut switch is in the pre-cut status when it is assigned to a route to the cutover facility, and the directory number in the post-cut switch is in the post-cut status when the directory number is assigned to the new originating equipment and facilities.

Previously, a per line migration was implemented. Thus, a call originating or terminating in one switch of the cutover wire center pair would traverse the cutover facility when the called number is hosted by the other switch of the cutover wire center pair. Calls originating from the cutover wire center pair to other points in the network would not traverse the cutover facility.

Interoffice originating demand shifts as the lines are cutover. Originating demand is served by the host of the directory number at any point in the cutover. Originating demand in the post-cut switch is served by interoffice facilities (IOF) provisioned by standard practice, since this requirement is present in any cutover. However, originating demand in the post-cut switch will increase as the corresponding demand in the pre-cut switch decreases.

During the cutover, two shared office code (NXX) demands are present on the cutover facility: (1) intraoffice, and (2) terminating from the network. Accordingly, cutover facilities which meet the intraoffice demand plus the terminating demand present at any given time during cutover are needed. The demand on the cutover facility of intraoffice traffic in the pre-cut and post-cut switches is directly related to the number of lines cutover.

Since the terminating demand from the network increases on the cutover facility as lines are cutover, the cutover facility must meet the entire terminating demand to advanced telecommunication systems (ATS) lines, minus terminating demand to non-ATS lines, presented by the network to the pre-cut switch. This requires a cutover facility approximately equal in size to the pre-cut switch's IOF capacity with respect to ATS lines. However, providing such capability is expensive and often may be difficult to implement.

Thus, it can be seen that there is a need for a method of performing cutover that reduces the size of the cutover facility. It can also be seen that there is a need for a method of performing cutover that shifts network terminating demand from the cutover facility to the post-cut switch. It can also be seen that there is a need for a method of performing cutover which synchronizes the demand maxima of intraoffice and terminating traffic thereby reducing the required capacity of the cutover facility.

SUMMARY OF THE INVENTION

To overcome the limitations in the prior art described above, and to overcome other limitations that will become apparent upon reading and understanding the present specification, the present invention discloses a switched cutover with paced transition.

The present invention solves the above-described problems by providing a method of performing cutover transitioning of subscribers to a new communication system while minimizing the capacity needed by the cutover facility.

A method in accordance with the principles of the present invention includes the steps of building a cutover facility between a pre-cut switch and a post-cut switch for transitioning a first and a second set of subscribers from a first communication system to a second communication system, beginning the migration of the first and the second set of subscribers from the pre-cut switch to the post-cut switch, identifying a transition midpoint, shifting the end office codes to the post-cut switch at the midpoint, and shifting the remaining subscribers on the pre-cut switch to the post-cut switch thereafter. The transition midpoint occurs when the number of subscribers migrated to the post-cut switch is equal to the number of subscribers remaining on the pre-cut switch.

An aspect of the invention is that the step of beginning the migration of the first and the second set of subscribers from the pre-cut switch to the post-cut switch comprises the step of migrating the first set of subscribers first.

Another aspect of the invention is that the transition midpoint occurs when the migration of the first set of subscribers to the post-cut switch is complete.

Another aspect of the invention is that the first set of subscribers comprise consumer broadband (CBB) lines.

Another aspect of the invention is that the second set of subscribers comprise non-CBB lines.

Yet another aspect of the invention is that the step of building the cutover facility further comprises the step of designing the cutover facility with capacity to meet midpoint intraoffice demand and terminating demand.

Another aspect of the invention is that the step of beginning the migration of subscribers further comprises the step of transitioning a directory number associated with a subscriber to the post-cut switch.

Another aspect of the invention is that the step of transitioning a directory number further comprises the step of individually transitioning each of the directory numbers.

Still another aspect of the invention is that the step of shifting the subscribers on the pre-cut switch to the post-cut switch further comprises the steps of assigning the point codes associated with the pre-cut switch to office codes associated with post-cut switch.

Another aspect of the invention is that a slice-cut dial-with-dial transfer of subscribers of the pre-cut switch to the post-cut switch is performed.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 3 illustrates a flow chart of the cutover process according to the present invention;

FIG. 4 illustrates the per line cutover terminating demand on the cutover facility according to the present invention.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method of performing cutover transitioning of subscribers to a new communication system while minimizing the capacity needed by the cutover facility.

Figure 1:
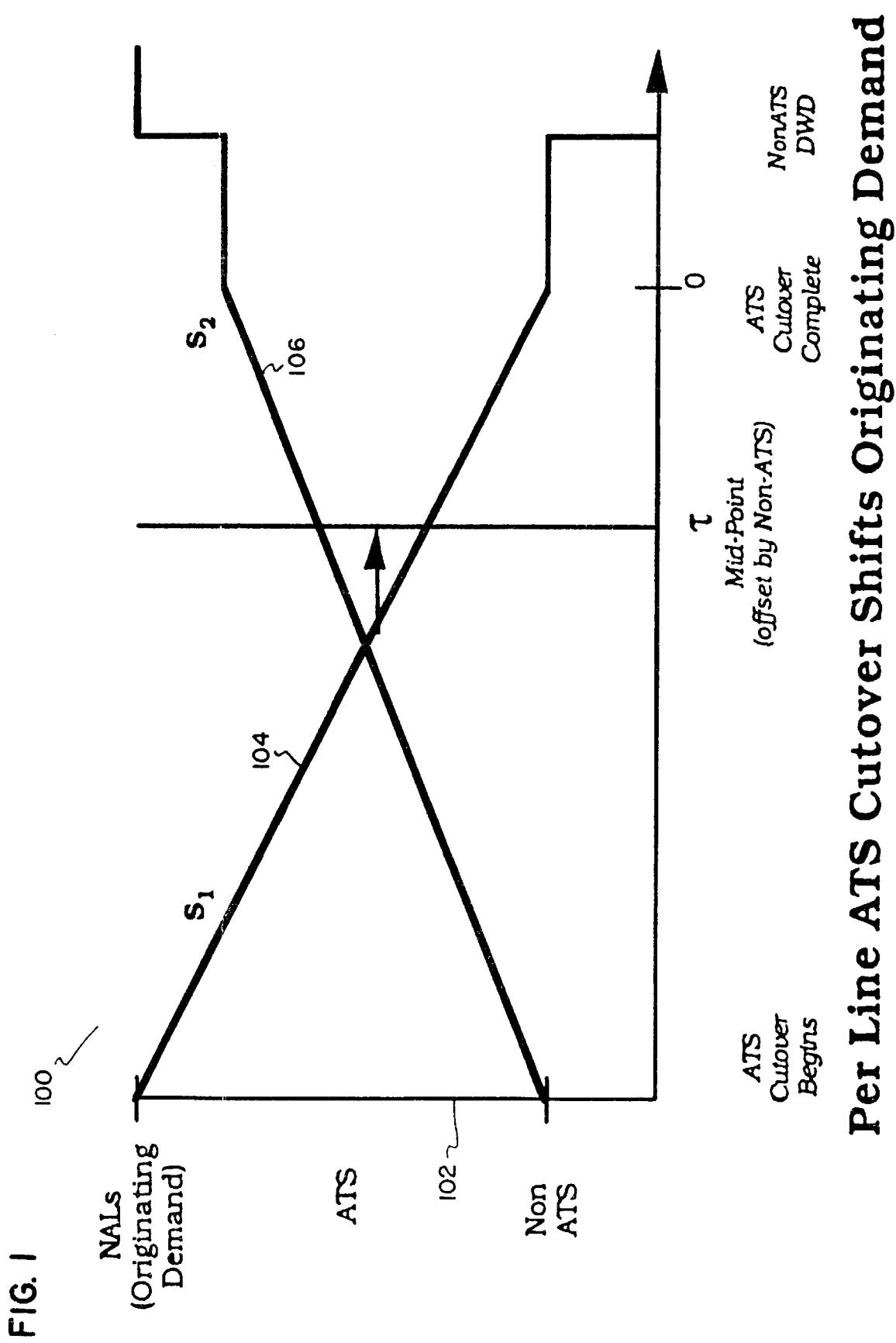
FIG. 1 illustrates a graph of the per line cutover shift of originating demand according to the present invention.

FIG. 1 illustrates a graph of the per line cutover shift of originating demand 100 according to the present invention. Interoffice originating demand 102 shifts with the number of lines cutover to the post-cut switch. Originating demand is serviced by the host of the directory number at any point in the cutover. The originating demand in the post-cut switch is served by interoffice facilities (IOF) provisioned by normal practices, since this requirement is present in any cutover. The originating demand 102 in the post-cut switch 104 will increase as the corresponding demand 102 in the pre-cut switch 106 decreases.

Figure 2:
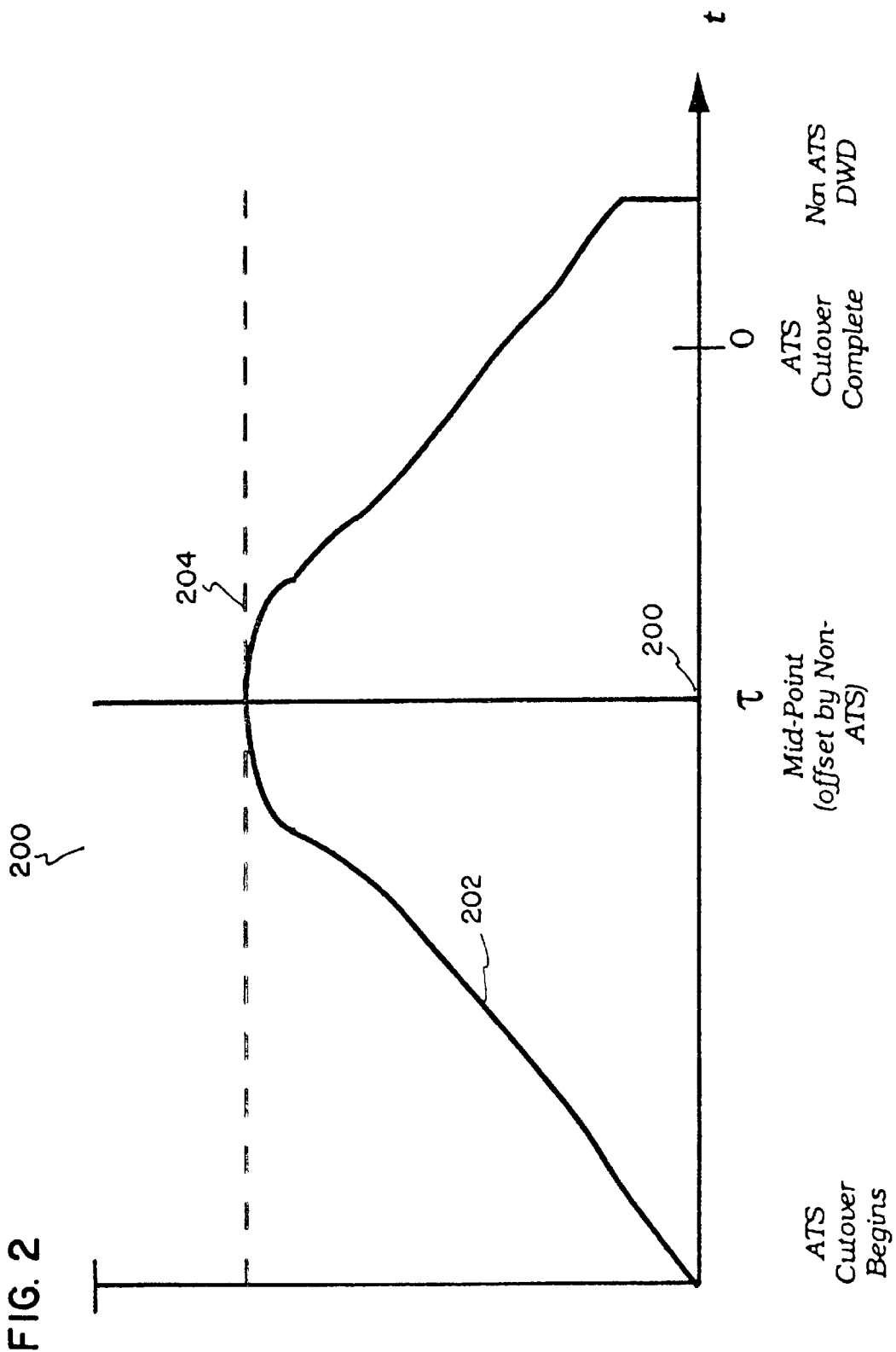
FIG. 2 illustrates the per line cutover intraoffice demand on the cutover facility according to the present invention.

FIG. 2 illustrates the per line cutover intraoffice demand on the cutover facility 200 according to the present invention. Two shared NXX demands are present on the cutover facility: (1) intraoffice, and (2) terminating from the network. The cutover facility must meet the expected intraoffice demand plus the terminating demand 202 that is present at any given time during cutover. The demand on the cutover facility of intraoffice traffic in the pre-cut and post-cut switches is directly related to the number of lines cutover, reaching maximum 204 around midpoint 206 in the transition. The midpoint 206 in the transition is at the highest probability that an intraoffice call will traverse the cutover facility. After the midpoint 206, the probability increases that both lines of an intraoffice call are in the post-cut switch.

In the neighborhood of the midpoint 206 of transition, the probability $E(S_2)$ that a directory number hosted by a post-cut switch, i.e., $S_2$, will be called becomes greater than the probability $E(S_1)$ that a directory number hosted by a pre-cut switch, i.e., $S_1$, will be called, with $E(S_2)=1-E(S_1)$. The probability $E(S_1)$ that a directory number is hosted by a pre-cut switch is strongly weighted by the number of non-advanced lines in the pre-cut switch. The midpoint 206 of transition can be approximated as the point in the advanced cutover switch when the traffic demand of the number of lines moved to the post-cut switch equals the traffic demand of the total number of lines remaining in the pre-cut switch. For example, in a wire center which is 50% advanced and 50% non-advanced technology types, and assuming uniform traffic demand for both types, midpoint occurs when all the advanced lines have been cutover.

FIG. 3 illustrates a flow chart of the cutover process 300 according to the present invention. A cutover facility is built (302) for transitioning a first and a second set of subscribers from a first communication system to a second communication system. The cutover facility includes the pre-cut switch and the post-cut switch and is designed with a capacity to meet the sum of intraoffice demand and terminating demand which occurs at the midpoint of the transition.

A route is assigned to the pre-cut switch associated with the first communication system for the first and second set of subscribers (304). Each subscriber has their own directory number.

Next, a route is assigned for the first and second set of subscribers to the post-cut switch associated with the second communication system (306). Then, subscribers are migrated from the pre-cut switch to the post-cut switch (308). The migration involves transitioning each of the subscriber's directory numbers to the post-cut switch.

Meanwhile, the migration is monitored to identify a transition midpoint (310). The transition midpoint is the point when approximately half of the subscribers have been migrated from the pre-cut switch to the post-cut switch. Finally, end office traffic routed to the pre-cut switch is shifted to the post-cut switch at the transition midpoint (312).

FIG. 4 illustrates the per line cutover terminating demand on the cutover facility 400 according to the present invention. The cutover facility may be established to merely meet the terminating demand 402 of the cutover facility; the expected maximum terminating demand 404 occurring at the cutover midpoint 406. For SS7 (and MF) Class 5 to Class 5 directly routed trunking, an alternative final route to the access tandem should be provided. Non-linearities in network originating or terminating demand will therefore appear first as traffic anomalies (i.e., sudden changes in overflow to or from the tandem) on the access tandem facilities to the wire center. The cutover facility itself will not require an alternate route, but should be carefully monitored for expected occupancy and zero overflow. Additional or unexpectedly rising demand on the cutover facility can be met by borrowing two-way trunks from the pre-cut facilities whose utilization has been reduced by the per line cutover or near midpoint and later, point code migration.

Figure 5A:
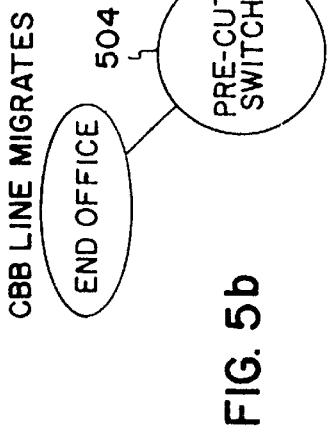
FIGS. 5a–5d illustrate the cutover process according to the present invention.

FIGS. 5a–5d illustrate the cutover process 500 according to the present invention. FIG. 5a illustrates the establishment of a cutover facility 502 between a pre-cut switch 504 and a post-cut switch 506. The cutover facility 502 is used for routing calls to and from subscribers 508 as they transition from the pre-cut switch 504 to the post-cut switch 506. The first and second set of subscribers are distinguished by the quality of lines, i.e., a set of the subscribers may be advanced telecommunications lines such as consumer broadband (CBB) lines.

Figure 5B:
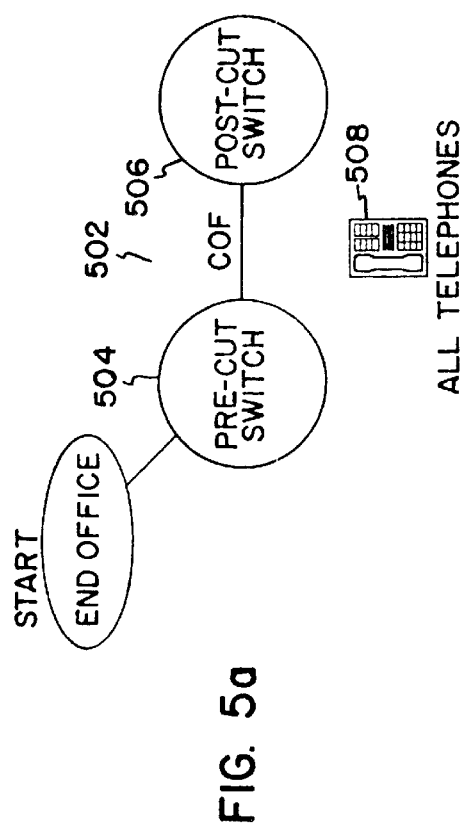

FIG. 5b illustrates the migration of the CBB subscribers 510 from the pre-cut switch 504 to the post-cut switch 506. For example, all consumer broadband (CBB) lines 510 may be transitioned to the post-cut switch 506 while the non-CBB lines 512 remain on the pre-cut switch 504.

Figure 5C:
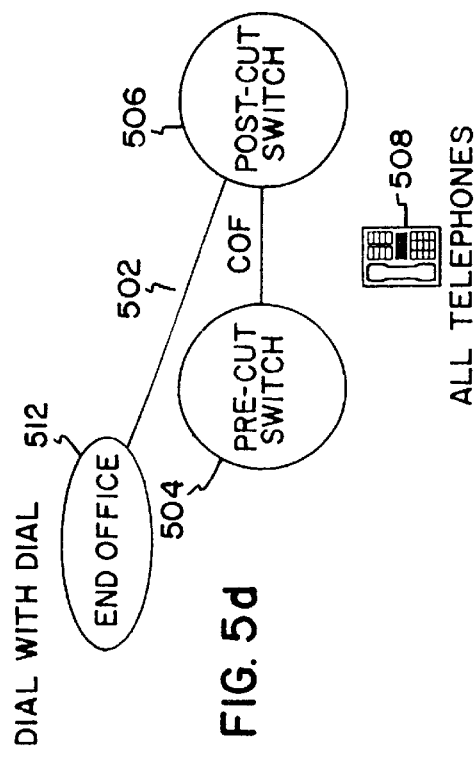
Figure 5D:
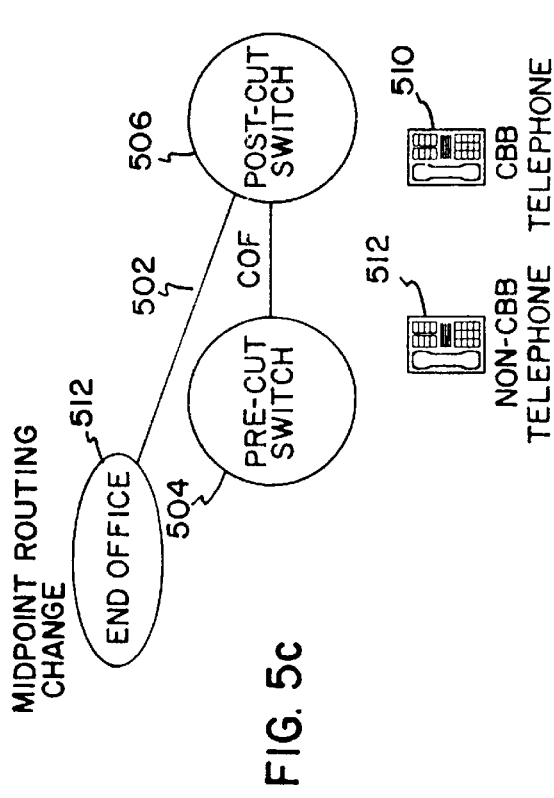

FIG. 5c illustrates the midpoint routing change. Once the transition midpoint is identified, the end office codes 520 are shifted to the post-cut switch 506. Finally, FIG. 5d illustrates the non-CBB subscribers 512 on the pre-cut switch 504 being shifted to the post-cut switch 506.

Accordingly, the cutover method reduces the size of the cutover facility. Network terminating demand may be shifted from the cutover facility to the post-cut switch to minimize the size of the cutover facility.

Nevertheless, according to the invention, the post-cut lines may be moved before the advanced cutover if an office lacks the capacity to fully provision a cutover facility, since this would relieve the planned cutover facility of non-advanced intraoffice and terminating demand during the cutover interval. If the non- advanced NXX dial transfer fails to yield sufficient facilities, IOF utilization may be reduced by a phased transition of NXX-Point Code routing in adjacent advanced nodes to the post-cut switch from the pre-cut switch. Initially, nodes are selected for the modest effect on trunking demand of their point code transition, so that the impact of the procedure can be carefully observed and controlled. As point codes are shifted, terminating demand on the interoffice facilities of the pre-cut switch is removed, thus liberating approximately half of the trunks allocated to the given interoffice route. Several iterations of this phased transition will yield a sufficient quantity of trunks to proceed with a cutover.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of managing network traffic including end office traffic comprising the steps of:

building a cutover facility for transitioning a first and a second set of subscribers from a first communication system to a second communication system, wherein the cutover facility couples a pre-cut switch to a post-cut switch;

assigning a route to the pre-cut switch associated with the first communication system for the first and second set of subscribers, each subscriber having a unique directory number;

assigning a route for the first and second set of subscribers to the post-cut switch associated with the second communication system;

migrating subscribers in at least one of the first and second sets of subscribers from the pre-cut switch to the post-cut switch;

identifying a transition midpoint, the transition midpoint being the point when approximately half of the subscribers have been migrated from the pre-cut switch to the post-cut switch; and shifting end office traffic routed to the pre-cut switch to the post-cut switch in response to the transition midpoint being identified.

2. The method of claim 1 wherein the step of building the cutover facility further comprises the step of designing the cutover facility with capacity to meet the sum of midpoint intraoffice demand and terminating demand.

3. The method of claim 1 wherein the step of migrating the directory numbers further comprises the step of transitioning individually each of the directory numbers to the post-cut switch.

4. The method of claim 1 wherein the step of identifying the transition midpoint further comprises the steps of counting the subscribers moved to the post-cut switch and determining when the number of subscribers moved to the post-cut switch equals the total number of subscribers remaining in the pre-cut switch.

5. The method of claim 1 wherein the step of shifting he end office traffic further comprises the steps of assigning the point codes associated with the pre-cut switch to office codes associated with post-cut switch.

6. The method of claim 5 wherein the first set of subscribers comprises consumer broadband lines and the second set of subscribers comprise non-consumer broadband lines, the method further comprising the step of performing slice-cut dial-with-dial transfer of the second set of subscribers from the pre-cut switch to the post-cut switch prior to the migration step.

7. The method of claim 6 further comprising the step of reducing interoffice facilities by phase transitioning point codes in advanced nodes coupled to the pre-cut switch from the pre-cut switch to the post-cut switch.

8. The method of claim 5 wherein the step of shifting the point codes further comprises the step of removing terminating demand on the interoffice facilities of the pre-cut switch to liberate trunks allocated to interoffice routes.

9. The method of claim 1 further comprising the step of performing slice-cut dial-with-dial transfer of subscribers of the pre-cut switch to the post-cut switch.

10. A method of managing network traffic and end office codes, comprising the steps of:

building a cutover facility between a pre-cut switch and a post-cut switch for transitioning a first and a second set of subscribers from a first communication system to a second communication system;

beginning the migration of the first and the second set of subscribers from the pre-cut switch to the post-cut switch;

identifying a transition midpoint, the transition midpoint being the point when the traffic demand of the number of subscribers migrated to the post-cut switch is equal to the traffic demand of the number of subscribers on the pre-cut switch;

shifting the end office codes to the post-cut switch; and shifting subscribers in at least one of the first and second sets of subscribers on the pre-cut switch to the post-cut switch.

11. The method of claim 10 wherein the step of beginning the migration of the first and the second set of subscribers from the pre-cut switch to the post-cut switch comprises the step of migrating the first set of subscribers first.

12. The method of claim 11 wherein the transition midpoint occurs when the migration of the first set of subscribers to the post-cut switch is complete.

13. The method of claim 12 wherein the first set of subscribers comprise consumer broadband lines.

14. The method of claim 12 wherein the second set of subscribers comprise non-consumer broadband lines.

15. The method of claim 10 wherein the step of building the cutover facility further comprises the step of designing the cutover facility with capacity to meet midpoint intraoffice demand and terminating demand.

16. The method of claim 10 wherein the step of beginning the migration of subscribers further comprises the step of transitioning a directory numbers associated with a subscriber to the post-cut switch.

17. The method of claim 10 wherein the step of transitioning a directory numbers further comprises the step of individually transitioning each of the directory numbers.

18. The method of claim 10 wherein the step of identifying the transition midpoint further comprises the steps of counting the subscribers moved to the post-cut switch and determining when the number of subscribers or the traffic demand generated by the subscribers moved to the post-cut switch equals the total number of subscribers or he traffic demand generated by the subscribers remaining in the pre-cut switch.

19. The method of claim 10 wherein the step of shifting the subscribers on the pre-cut switch to the post-cut switch further comprises the step of assigning the point codes associated with the pre-cut switch to office codes associated with post-cut switch.

20. The method of claim 19 wherein the step of assigning the point codes further comprises the step of removing terminating demand on the interoffice facilities of the pre-cut switch to liberate trunks allocated to interoffice routes.

21. The method of claim 10 further comprising the step of performing slice-cut dial-with-dial transfer of subscribers of the pre-cut switch to the post-cut switch.

22. The method of claim 10 wherein the first set of subscribers comprises consumer broadband lines and the second set of subscribers comprise non-consumer broadband lines, the method further comprising the step of performing slice-cut dial-with-dial transfer of the second set of subscribers from the pre-cut switch to the post-cut switch prior to the migration step.

23. The method of claim 10 further comprising the step of reducing interoffice facilities by phase transitioning point codes in advanced nodes coupled to the pre-cut switch from the pre-cut switch to the post-cut switch.

* * * * *